United States Patent
Dunn et al.

(10) Patent No.: US 10,255,884 B2
(45) Date of Patent: *Apr. 9, 2019

(54) SYSTEM AND METHOD FOR ENVIRONMENTAL ADAPTATION OF DISPLAY CHARACTERISTICS

(71) Applicant: Manufacturing Resources International, Inc., Alpharetta, GA (US)

(72) Inventors: William Dunn, Alpharetta, GA (US); Harry Presley, Alpharetta, GA (US); Jerry Wasinger, Alpharetta, GA (US)

(73) Assignee: Manufacturing Resources International, Inc., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/789,707

(22) Filed: Oct. 20, 2017

(65) Prior Publication Data

US 2018/0040297 A1    Feb. 8, 2018

Related U.S. Application Data

(63) Continuation of application No. 14/346,884, filed as application No. PCT/US2012/056942 on Sep. 24, 2012, now Pat. No. 9,799,306.
(Continued)

(51) Int. Cl.
*G09G 5/10* (2006.01)
*G09G 5/02* (2006.01)
(Continued)

(52) U.S. Cl.
CPC ............... *G09G 5/10* (2013.01); *G09G 5/02* (2013.01); *H04N 5/58* (2013.01);
(Continued)

(58) Field of Classification Search
CPC ..... G09G 5/10; G09G 5/02; G09G 2320/0238; G09G 2320/0271; G09G 2320/066;
(Continued)

(56) References Cited

U.S. PATENT DOCUMENTS

| | | | |
|---|---|---|---|
| 4,093,355 | A | 6/1978 | Kaplit et al. |
| 4,593,978 | A | 6/1986 | Mourey et al. |

(Continued)

FOREIGN PATENT DOCUMENTS

| | | |
|---|---|---|
| AU | 2016203550 B2 | 3/2018 |
| CA | 2754371 C | 11/2017 |

(Continued)

OTHER PUBLICATIONS

Kunkely, H. et al., Photochemistry and Beer, Journal of Chemical Education, Jan. 1982, pp. 25-27, vol. 59, No. 1.
(Continued)

*Primary Examiner* — Md Saiful A Siddiqui
(74) *Attorney, Agent, or Firm* — Standley Law Group LLP; Jeffrey S. Standley; Jeffrey C. Norris

(57) ABSTRACT

A system and method for altering the characteristics of a display based on environmental data is disclosed. Exemplary embodiments provide a light sensor, an environmental processing unit which is adapted to receive electrical signals from the light sensor and generate an environmentally-reactive control signal ($S_a$), an image signal processor which accepts $S_a$ and an encoded image signal ($S_e$) and generates a pre-decoding image signal ($S_p$), and an image signal decoder which accepts $S_p$ and generates a decoded image signal for the display. The environmentally-reactive control signal ($S_a$) may contain the instantaneous value of the desired display black level $S_b$. Alternatively or additionally, the environmentally-reactive control signal ($S_a$) may contain a signal linearity modification value.

20 Claims, 8 Drawing Sheets

Related U.S. Application Data

(60) Provisional application No. 61/538,319, filed on Sep. 23, 2011, provisional application No. 61/653,201, filed on May 30, 2012.

(51) Int. Cl.
 *H04N 5/58* (2006.01)
 *H04N 21/422* (2011.01)
 *H04N 21/431* (2011.01)

(52) U.S. Cl.
 CPC ... *H04N 21/42202* (2013.01); *H04N 21/4318* (2013.01); *G09G 2320/0238* (2013.01); *G09G 2320/0271* (2013.01); *G09G 2320/066* (2013.01); *G09G 2320/0626* (2013.01); *G09G 2320/0646* (2013.01); *G09G 2360/144* (2013.01)

(58) Field of Classification Search
 CPC ..... G09G 2320/0646; G09G 2360/144; G09G 2320/0626
 See application file for complete search history.

(56) References Cited

U.S. PATENT DOCUMENTS

| | | |
|---|---|---|
| 4,634,225 A | 1/1987 | Haim et al. |
| 5,029,982 A | 7/1991 | Nash |
| 5,086,314 A * | 2/1992 | Aoki ............... G03B 7/16 348/366 |
| 5,088,806 A | 2/1992 | McCartney et al. |
| 5,162,785 A | 11/1992 | Fagard |
| 5,247,374 A | 9/1993 | Terada |
| 5,559,614 A | 9/1996 | Urbish et al. |
| 5,661,374 A | 8/1997 | Cassidy et al. |
| 5,748,269 A | 5/1998 | Harris et al. |
| 5,767,489 A | 6/1998 | Ferrier |
| 5,783,909 A | 7/1998 | Hochstein |
| 5,786,801 A | 7/1998 | Ichise |
| 5,808,418 A | 9/1998 | Pitman et al. |
| 5,818,010 A | 10/1998 | McCann |
| 5,952,992 A | 9/1999 | Helms |
| 5,991,153 A | 11/1999 | Heady et al. |
| 6,089,751 A | 7/2000 | Conover et al. |
| 6,144,359 A | 11/2000 | Grave |
| 6,153,985 A | 11/2000 | Grossman |
| 6,157,143 A | 12/2000 | Bigio et al. |
| 6,157,432 A | 12/2000 | Helbing |
| 6,181,070 B1 | 1/2001 | Dunn et al. |
| 6,191,839 B1 | 2/2001 | Briley et al. |
| 6,259,492 B1 | 7/2001 | Imoto et al. |
| 6,292,228 B1 | 9/2001 | Cho |
| 6,297,859 B1 | 10/2001 | George |
| 6,380,853 B1 | 4/2002 | Long et al. |
| 6,388,388 B1 | 5/2002 | Weindorf et al. |
| 6,400,101 B1 | 6/2002 | Biebl et al. |
| 6,417,900 B1 | 7/2002 | Shin et al. |
| 6,496,236 B1 | 12/2002 | Cole et al. |
| 6,509,911 B1 | 1/2003 | Shimotono |
| 6,535,266 B1 | 3/2003 | Nemeth et al. |
| 6,628,355 B1 | 9/2003 | Takahara |
| 6,701,143 B1 | 3/2004 | Dukach et al. |
| 6,712,046 B2 | 3/2004 | Nakamichi |
| 6,753,661 B2 | 6/2004 | Muthu et al. |
| 6,753,842 B1 | 6/2004 | Williams et al. |
| 6,762,741 B2 | 7/2004 | Weindorf |
| 6,798,341 B1 | 9/2004 | Eckel et al. |
| 6,809,718 B2 | 10/2004 | Wei et al. |
| 6,812,851 B1 | 11/2004 | Dukach et al. |
| 6,813,375 B2 | 11/2004 | Armato, III et al. |
| 6,839,104 B2 | 1/2005 | Taniguchi et al. |
| 6,850,209 B2 | 2/2005 | Mankins et al. |
| 6,885,412 B2 | 4/2005 | Ohnishi et al. |
| 6,886,942 B2 | 5/2005 | Okada et al. |
| 6,891,135 B2 | 5/2005 | Pala et al. |
| 6,943,768 B2 | 9/2005 | Cavanaugh et al. |
| 6,982,686 B2 | 1/2006 | Miyachi et al. |
| 6,996,460 B1 | 2/2006 | Krahnstoever et al. |
| 7,015,470 B2 | 3/2006 | Faytlin et al. |
| 7,038,186 B2 | 5/2006 | De Brabander et al. |
| 7,064,733 B2 | 6/2006 | Cok et al. |
| 7,083,285 B2 | 8/2006 | Hsu et al. |
| 7,136,076 B2 * | 11/2006 | Evanicky ............ G01J 3/02 345/600 |
| 7,174,029 B2 | 2/2007 | Agostinelli et al. |
| 7,176,640 B2 | 2/2007 | Tagawa |
| 7,236,154 B1 * | 6/2007 | Kerr ............... G06F 1/1616 345/102 |
| 7,307,614 B2 | 12/2007 | Vinn |
| 7,324,080 B1 | 1/2008 | Hu et al. |
| 7,330,002 B2 | 2/2008 | Joung |
| 7,354,159 B2 | 4/2008 | Nakamura et al. |
| 7,474,294 B2 | 1/2009 | Leo et al. |
| 7,480,042 B1 | 1/2009 | Phillips et al. |
| 7,518,600 B2 | 4/2009 | Lee |
| 7,595,785 B2 | 9/2009 | Jang |
| 7,639,220 B2 | 12/2009 | Yoshida et al. |
| 7,659,676 B2 | 2/2010 | Hwang |
| 7,692,621 B2 | 4/2010 | Song |
| 7,724,247 B2 | 5/2010 | Yamazaki et al. |
| 7,795,574 B2 | 9/2010 | Kennedy et al. |
| 7,795,821 B2 | 9/2010 | Jun |
| 7,800,706 B2 | 9/2010 | Kim et al. |
| 7,804,477 B2 | 9/2010 | Sawada et al. |
| 7,982,706 B2 | 7/2011 | Ichikawa et al. |
| 8,087,787 B2 | 1/2012 | Medin |
| 8,111,371 B2 | 2/2012 | Suminoe et al. |
| 8,125,163 B2 | 2/2012 | Dunn et al. |
| 8,144,110 B2 | 3/2012 | Huang |
| 8,175,841 B2 | 5/2012 | Ooghe |
| 8,194,031 B2 | 6/2012 | Yao et al. |
| 8,248,203 B2 | 8/2012 | Hanwright et al. |
| 8,352,758 B2 | 1/2013 | Atkins et al. |
| 8,508,155 B2 | 8/2013 | Schuch |
| 8,569,910 B2 | 10/2013 | Dunn et al. |
| 8,605,121 B2 | 12/2013 | Chu et al. |
| 8,700,226 B2 | 4/2014 | Schuch et al. |
| 8,797,372 B2 | 8/2014 | Liu |
| 8,810,501 B2 | 8/2014 | Budzelaar et al. |
| 8,823,630 B2 | 9/2014 | Roberts et al. |
| 8,829,815 B2 | 9/2014 | Dunn et al. |
| 8,895,836 B2 | 11/2014 | Amin et al. |
| 8,901,825 B2 | 12/2014 | Reed |
| 8,982,013 B2 | 3/2015 | Sako et al. |
| 8,983,385 B2 | 3/2015 | Macholz |
| 8,988,011 B2 | 3/2015 | Dunn |
| 9,030,129 B2 | 5/2015 | Dunn et al. |
| 9,167,655 B2 | 10/2015 | Dunn et al. |
| 9,286,020 B2 | 3/2016 | Dunn et al. |
| 9,448,569 B2 | 9/2016 | Schuch et al. |
| 9,451,060 B1 | 9/2016 | Bowers et al. |
| 9,516,485 B1 | 12/2016 | Bowers et al. |
| 9,536,325 B2 | 1/2017 | Bray et al. |
| 9,622,392 B1 | 4/2017 | Bowers et al. |
| 9,799,306 B2 | 10/2017 | Dunn et al. |
| 9,867,253 B2 | 1/2018 | Dunn et al. |
| 9,881,528 B2 | 1/2018 | Dunn |
| 9,924,583 B2 | 3/2018 | Schuch et al. |
| 2002/0009978 A1 | 1/2002 | Dukach et al. |
| 2002/0050974 A1 | 5/2002 | Rai et al. |
| 2002/0065046 A1 | 5/2002 | Mankins et al. |
| 2002/0084891 A1 | 7/2002 | Mankins et al. |
| 2002/0101553 A1 | 8/2002 | Enomoto et al. |
| 2002/0112026 A1 | 8/2002 | Fridman et al. |
| 2002/0126248 A1 | 9/2002 | Yoshida |
| 2002/0154138 A1 | 10/2002 | Wada et al. |
| 2002/0164962 A1 | 11/2002 | Mankins et al. |
| 2002/0167637 A1 | 11/2002 | Burke et al. |
| 2002/0190972 A1 | 12/2002 | Ven de Van |
| 2003/0007109 A1 | 1/2003 | Park |
| 2003/0088832 A1 | 5/2003 | Agostinelli et al. |
| 2003/0122810 A1 | 7/2003 | Tsirkel et al. |
| 2003/0204342 A1 | 10/2003 | Law et al. |
| 2003/0214242 A1 | 11/2003 | Berg-johansen |

(56) References Cited

U.S. PATENT DOCUMENTS

| | | |
|---|---|---|
| 2003/0230991 A1 | 12/2003 | Muthu et al. |
| 2004/0032382 A1 | 2/2004 | Cok et al. |
| 2004/0036622 A1 | 2/2004 | Dukach et al. |
| 2004/0036697 A1 | 2/2004 | Kim et al. |
| 2004/0036834 A1 | 2/2004 | Ohnishi et al. |
| 2004/0113044 A1 | 6/2004 | Ishiguchi |
| 2004/0165139 A1 | 8/2004 | Anderson et al. |
| 2004/0201547 A1 | 10/2004 | Takayama |
| 2004/0243940 A1 | 12/2004 | Lee et al. |
| 2005/0012734 A1 | 1/2005 | Johnson et al. |
| 2005/0043907 A1 | 2/2005 | Eckel et al. |
| 2005/0049729 A1 | 3/2005 | Culbert et al. |
| 2005/0073518 A1 | 4/2005 | Bontempi |
| 2005/0094391 A1 | 5/2005 | Campbell et al. |
| 2005/0127796 A1 | 6/2005 | Olesen et al. |
| 2005/0140640 A1 | 6/2005 | Oh et al. |
| 2005/0184983 A1 | 8/2005 | Brabander et al. |
| 2005/0231457 A1 | 10/2005 | Yamamoto et al. |
| 2005/0242741 A1 | 11/2005 | Shiota et al. |
| 2006/0007107 A1 | 1/2006 | Ferguson |
| 2006/0022616 A1 | 2/2006 | Furukawa et al. |
| 2006/0038511 A1 | 2/2006 | Tagawa |
| 2006/0049533 A1 | 3/2006 | Kamoshita |
| 2006/0087521 A1 | 4/2006 | Chu et al. |
| 2006/0125773 A1 | 6/2006 | Ichikawa et al. |
| 2006/0130501 A1 | 6/2006 | Singh et al. |
| 2006/0197474 A1 | 9/2006 | Olsen |
| 2006/0197735 A1 | 9/2006 | Vuong et al. |
| 2006/0214904 A1 | 9/2006 | Kimura et al. |
| 2006/0215044 A1 | 9/2006 | Masuda et al. |
| 2006/0220571 A1 | 10/2006 | Howell et al. |
| 2006/0238531 A1 | 10/2006 | Wang |
| 2006/0244702 A1 | 11/2006 | Yamazaki et al. |
| 2007/0013828 A1 | 1/2007 | Cho et al. |
| 2007/0047808 A1 | 3/2007 | Choe et al. |
| 2007/0152949 A1* | 7/2007 | Sakai ............ G09G 3/3406 345/102 |
| 2007/0171647 A1 | 7/2007 | Artwohl et al. |
| 2007/0173297 A1 | 7/2007 | Cho et al. |
| 2007/0200513 A1 | 8/2007 | Ha et al. |
| 2007/0222730 A1* | 9/2007 | Kao ............... G09G 3/2059 345/89 |
| 2007/0230167 A1 | 10/2007 | McMahon et al. |
| 2007/0242153 A1 | 10/2007 | Tang et al. |
| 2007/0247594 A1 | 10/2007 | Tanaka |
| 2007/0268234 A1 | 11/2007 | Wakabayashi et al. |
| 2007/0268241 A1 | 11/2007 | Nitta et al. |
| 2007/0273624 A1 | 11/2007 | Geelen |
| 2007/0279369 A1 | 12/2007 | Yao et al. |
| 2007/0291198 A1 | 12/2007 | Shen |
| 2007/0297163 A1 | 12/2007 | Kim et al. |
| 2007/0297172 A1 | 12/2007 | Furukawa et al. |
| 2008/0055297 A1 | 3/2008 | Park |
| 2008/0074382 A1 | 3/2008 | Lee et al. |
| 2008/0078921 A1 | 4/2008 | Yang et al. |
| 2008/0084166 A1 | 4/2008 | Tsai |
| 2008/0111958 A1 | 5/2008 | Kleverman et al. |
| 2008/0136770 A1 | 6/2008 | Peker et al. |
| 2008/0143187 A1 | 6/2008 | Hoekstra et al. |
| 2008/0151082 A1 | 6/2008 | Chan |
| 2008/0170031 A1 | 7/2008 | Kuo |
| 2008/0176345 A1 | 7/2008 | Yu et al. |
| 2008/0185976 A1 | 8/2008 | Dickey et al. |
| 2008/0204375 A1* | 8/2008 | Shin ............... G09G 3/2003 345/76 |
| 2008/0218501 A1 | 9/2008 | Diamond |
| 2008/0246871 A1 | 10/2008 | Kupper et al. |
| 2008/0266554 A1 | 10/2008 | Sekine et al. |
| 2008/0278099 A1 | 11/2008 | Bergfors et al. |
| 2008/0278100 A1 | 11/2008 | Hwang |
| 2008/0303918 A1 | 12/2008 | Keithley |
| 2009/0009997 A1 | 1/2009 | Sanfilippo et al. |
| 2009/0033612 A1 | 2/2009 | Roberts et al. |
| 2009/0079416 A1 | 3/2009 | Vinden et al. |
| 2009/0085859 A1 | 4/2009 | Song |
| 2009/0091634 A1 | 4/2009 | Kennedy et al. |
| 2009/0104989 A1 | 4/2009 | Williams et al. |
| 2009/0135167 A1 | 5/2009 | Sakai et al. |
| 2009/0152445 A1 | 6/2009 | Gardner, Jr. |
| 2009/0278766 A1 | 11/2009 | Sako et al. |
| 2009/0284457 A1 | 11/2009 | Botzas et al. |
| 2009/0289968 A1 | 11/2009 | Yoshida |
| 2010/0039366 A1 | 2/2010 | Hardy |
| 2010/0039440 A1 | 2/2010 | Tanaka et al. |
| 2010/0060861 A1 | 3/2010 | Medin |
| 2010/0177750 A1 | 7/2010 | Essinger et al. |
| 2010/0194725 A1 | 8/2010 | Yoshida et al. |
| 2010/0231602 A1 | 9/2010 | Huang |
| 2010/0253660 A1 | 10/2010 | Hashimoto |
| 2011/0032285 A1 | 2/2011 | Yao et al. |
| 2011/0050738 A1 | 3/2011 | Fujioka et al. |
| 2011/0058326 A1 | 3/2011 | Idems et al. |
| 2011/0074737 A1 | 3/2011 | Hsieh et al. |
| 2011/0074803 A1 | 3/2011 | Kerofsky |
| 2011/0102630 A1 | 5/2011 | Rukes |
| 2011/0163691 A1 | 7/2011 | Dunn |
| 2011/0175872 A1 | 7/2011 | Chuang et al. |
| 2011/0193872 A1 | 8/2011 | Biemath et al. |
| 2011/0231676 A1 | 9/2011 | Atkins et al. |
| 2011/0260534 A1 | 10/2011 | Rozman et al. |
| 2011/0279426 A1 | 11/2011 | Imamura et al. |
| 2011/0283199 A1 | 11/2011 | Schuch et al. |
| 2012/0075362 A1 | 3/2012 | Ichioka et al. |
| 2012/0081279 A1 | 4/2012 | Greenebaum et al. |
| 2012/0176420 A1 | 7/2012 | Liu |
| 2012/0182278 A1 | 7/2012 | Ballestad |
| 2012/0268436 A1* | 10/2012 | Chang ............ G09G 3/34 345/207 |
| 2012/0269382 A1 | 10/2012 | Kiyohara et al. |
| 2012/0284547 A1 | 11/2012 | Culbert et al. |
| 2013/0027370 A1 | 1/2013 | Dunn et al. |
| 2013/0098425 A1 | 4/2013 | Amin et al. |
| 2013/0113973 A1 | 5/2013 | Miao |
| 2013/0158730 A1 | 6/2013 | Yasuda et al. |
| 2013/0278868 A1 | 10/2013 | Dunn et al. |
| 2014/0002747 A1 | 1/2014 | Macholz |
| 2014/0132796 A1 | 5/2014 | Prentice et al. |
| 2014/0139116 A1 | 5/2014 | Reed |
| 2014/0204452 A1 | 7/2014 | Branson |
| 2014/0232709 A1 | 8/2014 | Dunn et al. |
| 2014/0365965 A1 | 12/2014 | Bray et al. |
| 2015/0062892 A1 | 3/2015 | Krames et al. |
| 2015/0070337 A1 | 3/2015 | Bell et al. |
| 2015/0346525 A1 | 12/2015 | Wolf et al. |
| 2015/0348460 A1 | 12/2015 | Cox et al. |
| 2016/0037606 A1 | 4/2016 | Dunn et al. |
| 2016/0198545 A1 | 7/2016 | Dunn et al. |
| 2016/0334811 A1 | 11/2016 | Marten |
| 2016/0338181 A1 | 11/2016 | Schuch et al. |
| 2016/0338182 A1 | 11/2016 | Schuch et al. |
| 2016/0358530 A1 | 12/2016 | Schuch et al. |
| 2016/0358538 A1 | 12/2016 | Schuch et al. |
| 2017/0111486 A1 | 4/2017 | Bowers et al. |
| 2017/0111520 A1 | 4/2017 | Bowers et al. |
| 2017/0168295 A1 | 6/2017 | Iwami |
| 2018/0012565 A1 | 1/2018 | Dunn |
| 2018/0042134 A1 | 2/2018 | Dunn et al. |
| 2018/0132327 A1 | 5/2018 | Dunn et al. |
| 2018/0206316 A1 | 7/2018 | Schuch et al. |

FOREIGN PATENT DOCUMENTS

| | | |
|---|---|---|
| EP | 0313331 B1 | 2/1994 |
| EP | 2299723 A1 | 3/2011 |
| EP | 2401738 A2 | 1/2012 |
| EP | 2577389 A2 | 4/2013 |
| EP | 2769376 A1 | 8/2014 |
| EP | 3295452 A1 | 3/2018 |
| EP | 2401738 B1 | 5/2018 |
| EP | 3338273 A1 | 6/2018 |
| GB | 2369730 A | 5/2002 |
| JP | 3-153212 A | 7/1991 |
| JP | 6-18767 A | 1/1993 |
| JP | 8193727 A | 7/1996 |

(56) References Cited

FOREIGN PATENT DOCUMENTS

| | | | |
|---|---|---|---|
| JP | 08338981 A | 12/1996 |
| JP | 11-160727 A | 6/1999 |
| JP | 2000122575 A | 4/2000 |
| JP | 2004325629 A | 11/2004 |
| JP | 2005148490 A | 6/2005 |
| JP | 2005338266 A | 8/2005 |
| JP | 2005265922 A | 9/2005 |
| JP | 2006-145890 A | 6/2006 |
| JP | 2006318733 A | 11/2006 |
| JP | 2007003638 A | 1/2007 |
| JP | 2007322718 A | 12/2007 |
| JP | 2008-34841 A | 2/2008 |
| JP | 2008083290 A | 4/2008 |
| JP | 2008122695 A | 5/2008 |
| JP | 2009031622 A | 2/2009 |
| JP | 2010181487 A | 8/2010 |
| JP | 2011059543 A | 3/2011 |
| JP | 2018-523148 A | 8/2018 |
| JP | 2018-0525650 A | 9/2018 |
| KR | 10-2006-0016469 A | 2/2006 |
| KR | 10-0768584 B1 | 10/2007 |
| KR | 10-2008-0000144 A | 1/2008 |
| KR | 10-2008-0013592 A | 2/2008 |
| KR | 10-2008-0086245 A | 9/2008 |
| KR | 10-2011-0125249 A | 11/2011 |
| KR | 10-1759265 B1 | 7/2017 |
| WO | 2008/050402 A1 | 5/2008 |
| WO | 2010/141739 A2 | 12/2010 |
| WO | 2011/052331 A1 | 5/2011 |
| WO | 2011/130461 A2 | 10/2011 |
| WO | 2011/150078 A2 | 12/2011 |
| WO | 2013/044245 A1 | 3/2013 |
| WO | 2016/183576 A1 | 11/2016 |
| WO | 2017/031237 A1 | 2/2017 |
| WO | 2018/009917 A1 | 1/2018 |

OTHER PUBLICATIONS

Novitsky, T. et al., Design How-To, Driving LEDs versus CCFLs for LCD backlighting, EE Times, Nov. 12, 2007, 6 pages, AspenCore.

Zeef, Hubing, EMC analysis of 18' LCD Monitor, Aug. 2000, 1 page.

Lee, X., What is Gamma Correcton in Images and Videos?, http://xahlee.info/img/what_is_gamma_correction.html, Feb. 24, 2010, 1 page.

\* cited by examiner

SYSTEM AND METHOD FOR ENVIRONMENTAL ADAPTATION OF DISPLAY CHARACTERISTICS

CROSS-REFERENCE TO RELATED APPLICATIONS

This application is a continuation of U.S. application Ser. No. 14/346,884, filed on Mar. 24, 2014, which claims the priority benefit of PCT Application No. PCT/US2012/056942, filed on Sep. 24, 2012, which claims priority to U.S. Application No. 61/538,319, filed on Sep. 23, 2011, and U.S. Application No. 61/653,201, filed on May 30, 2012, each of which is hereby incorporated by reference in its entirety.

TECHNICAL FIELD

The exemplary embodiments herein pertain to a display and a method that utilizes measured properties of the viewing environment in order to automatically vary the visual characteristics of a display according to a set of predefined rules. Some embodiments provide an autonomous display that exhibits optimal visual perception for image reproduction at all environmental viewing conditions.

BACKGROUND OF THE ART

Displays are used in a very wide range of applications, including entertainment (e.g., television, e-books), advertisement (e.g., shopping malls, airports, billboards), information (e.g., automotive, avionics, system monitoring, security), and cross-applications (e.g., computers, smart phones)—there are literally hundreds of specific applications. As such, displays are generally subject to a wide range of viewing environments, and in many applications the viewing environment of the display is not a constant. Therefore, it stands to reason that if the viewing environment can change then the visual characteristics of the display might also warrant change in order to maintain optimal performance and fidelity. The primary visual characteristics of a display are brightness (often called contrast or picture), black level (confusingly called brightness), saturation (color intensity), hue (sometimes called tint), and sharpness. All five of these visual properties can be endowed with automatic adaptation to changing environmental viewing conditions.

A very high-level diagram of the image capture and reproduction process is shown in FIG. 1. Images typically originate from either real-world scenes captured by video/still cameras or from computer-generated scenery. The lofty goal of most reproduction systems is to display the most life-like image that is possible to the final human observer. There are very many impediments to doing this perfectly; in fact, some "enhancements" are often purposely added to the displayed image to improve the viewing experience. One of the major impediments to high-fidelity reproduction is that the local viewing environment of the final observer cannot be definitively predicted, yet the viewing environment can have a profound impact on the visual quality of the reproduction. Also, the viewing environment can change almost continuously except in a few special cases such as the tightly controlled environment of a theater.

A subtle but very germane aspect of FIG. 1 is that the total light that is reflected from a physical object is essentially the linear summation of the reflected light from all light sources that impinge upon the object. In addition, an object may also emit its own light, and this light is also linearly added to the reflected contributions from the object in order to arrive at the total observed light. This is basically a statement that incoherent light behaves linearly in this regard (e.g., 1+1=2). As a result the absolute brightness or luminance of any point in a scene is proportional to all constituent components of light that are traceable to that point. This is the reality that is presented to the human observer of a real scene, and is also the manner in which computer-generated scenery is typically created. Therefore, in theory a display device should also adhere to the principle of luminance linearity for the purest form of reproduction. Or more generally, the entire end-to-end chain of processes, from the light that enters a camera to the light that exits the display, should adhere to the principle of luminance linearity. This principle will be relevant to various aspects of the subject invention.

As mentioned above, the goal of a display should be to reproduce a life-like replica of the original scene. But there are several inherent and unavoidable limitations. One such limitation is the difficulty for a display to match the dynamic range of luminance that exists in the real world, especially at the upper end of the scale (e.g., the sun and reflections thereof). Another limitation is that a display is a predominately "flat" version of the original scene; hence true three-dimensional (3D) depth reproduction is not possible, although various "3D" technologies exist to produce the illusion of depth, at least from one or more specific perspectives. Also, common displays cannot begin to simulate the nearly hemispherical field-of-view of the human eye, although special venues such as IMAX® theaters attempt to overcome this. Finally, the display itself is a physical object that exists in some environment, and the environment itself can have a very significant impact on the visual quality of the reproduction.

In a traditional color display each pixel is typically comprised of 3 sub-pixels, one for each of the primary colors—typically red, green, and blue. While there are displays that may use 4 or more sub-pixels, the embodiments herein do not depend on the precise number of sub-pixels or colors that they represent. The information content of a displayed image is the result of uniquely commanding, or driving, each sub-pixel, with the specifics of the driving process being technology-dependent (e.g., CRT, plasma, LCD, OLED, etc.). The drive level of each sub-pixel can range from full off to full on—this is the fundamental process by which images are formed by a display. The total range of displayable colors (i.e., the color gamut) is obtained by varying the relative drive levels of the sub-pixels through their entire range of combinations. Non-primary colors are produced when the human eye integrates the 3 sub-pixels to produce an effective blended color via the controlled mixing of the primary colors. In the digital domain if the sub-pixel drive levels are defined with 8 digital bits then there can be a total of $2^8=256$ distinct drive levels per sub-pixel. A gray level is a special case where all sub-pixels are being driven at the same level (as defined by VESA FPDM 2.0). This will generally produce a 'gray-like' color ranging from full off (lowest brightness, appearing predominately black) to full on (highest brightness, appearing predominately white). Continuing with 8 bits per sub-pixel (often called 24-bit color: 3 sub-pixels×8 bits=24) there are $2^{24}=16,777,216$ possible colors, but only 256 unique gray levels by the strict definition that gray levels are produced when all sub-pixels are identically driven. For simplicity we shall speak of gray levels on a sub-pixel basis (i.e., 256 gray levels for 8 bits of control) with the implicit understanding that neighboring sub-pixels are not necessarily driven to the same level as required for the generation of color images. This is because the invention stands independent of color reproduction, but is completely compatible with color reproduction.

Gamma (symbolized by γ) refers to the mathematic exponent in a power function $S^\gamma$ that transforms the scaling of gray levels (on a sub-pixel basis) in an image. Although the roots of gamma processing trace back to the earliest days of vacuum-tube cameras and CRT displays, it is still a very relevant process in modern displays for improving the perceived resolution in the darker regions of an image where human vision is more sensitive to absolute changes in brightness.

The conceptually simplest image reproduction stream is illustrated in FIG. 2. Light from a real-world scene ($L_i$) is captured by the camera and falls onto a detector (commonly a solid-state pixilated detector using CCD or CMOS technology) that performs an optical-to-electrical (O/E) conversion to generate the initial source image signal $S_s$. This image signal is typically a voltage signal that is approximately proportional to the amount of light falling on each pixilated detector element, but $S_s$ may be immediately converted into a digital signal. Alternatively, the source image signal $S_s$ may originate from computer-generated graphics that are typically developed in the linear domain in much the same way as light behaves in the real world. In either case, signal encoding occurs in the function block labeled $f_e$, which typically (though not necessarily) takes the form of a power function: $f_e=(S)^\alpha$. Historically the α exponent is referred to as a gamma-correction exponent, but herein it will be referred to more generally as a signal encoding exponent. The resulting encoded signal $S_e$ ($=(S_s)^\alpha$) then enters the display and is decoded by the function block labeled $f_d$, which typically (though not necessarily) takes the form of another power function: $f_d=(S)^\gamma$. By substitution the resulting decoded signal $S_d$ ($=(S_e)^\gamma$) that drives the display is related to the initial source image signal $S_s$ via $S_d=(S_s)^{\alpha\gamma}$. It is noted that in practice there are variants to the relatively simple transformations described above, but the general process of encoding and decoding image signals is the same.

Referring still to FIG. 2, the decoded image signal $S_d$ is then used to drive the components in the display that convert the electrical image data into light that is emitted by the display ($L_o$) via an electrical-to-optical (E/O) conversion process. The details of the E/O process are unique to the display technology; e.g., LCD, plasma, OLED, etc. In fact, for the virtually obsolete CRT technology the decoding function $f_d$ was an integral part of the E/O conversion process.

It is noted in the above discussions that the signals 'S' represent normalized values typically ranging from 0 to 1. For the case of voltage signals, the actual signals would be normalized by $V_{MAX}$ such that $S=V_{actual}/V_{MAX}$. For the case of digital signals, the signals would be normalized by $D_{MAX}$ such that $S=D_{actual}/D_{MAX}$ (e.g., for an 8-bit channel $D_{MAX}=2^8=256$). The signal normalization process generally requires processing steps that are not explicitly shown in FIG. 2, but are implied herein. As long as normalized signals are consistently used it does not matter whether the signals represent voltage levels or bit levels.

As a specific example of an end-to-end image processing stream, ITU-R BT.709-5 (2002) recommends encoding a television signal with an α value of ≈0.5 (Note: this is a slight simplification of BT.709), while ITU-R BT.1886 (2011) recommends decoding a television signal with a γ value of 2.4, leading to an end-to-end power (c) of 1.2: $S_d=S_e^{2.4}=(S_s^{0.5})^{2.4}=S_s^{(0.5 \times 1.2)}=S_s^{1.2}$. The signal transformations that occur in the above ITU-defined processes are illustrated in FIG. 3, where the parameters for the horizontal 'input' axis and vertical 'output' axis depend on the relevant processing step. For example, during the signal encoding operation the horizontal axis would represent $S_s$ (as the input signal) while the vertical axis would represent $S_e$ (as the output signal). The implied normalization of signals is evident in FIG. 3 since all signal levels reside between the values of 0 and 1.

It is noted in FIG. 3 that the ITU-R BT.709/1886 signal transformation processes do not strictly adhere to the aforementioned principle of end-to-end luminance linearity since the reproduction system has an end-to-end power law exponent of ε=1.2, rather than ε=1.0 as would be the case for pure linearity. This produces the slight curve of the black line in FIG. 3. The primary reason for deviating from pure linearity is that a camera/display cannot practically reproduce the full dynamic range of light that exists in the real world. As a result, the end-to-end exponent (or power) of ε=1.2 is generally considered to produce a better perceptual experience for in-home television viewing with an average background illumination of ≈200 lux. This is based on reproducing a more life-like image contrast when the human eye is adapted to the typical in-home environment.

However, it is common for movie producers to deviate from ITU-R BT.709 encoding in order to target much darker viewing environments such as theaters with a background illumination of ≈1-10 lux and/or to create artistically-flavored video content. A typical encoding exponent for this application is approximately α=0.60. If this signal is subsequently decoded with a power exponent γ=2.4 then the end-to-end linearity power is ε≈1.45.

Another popular image encoding scheme is the sRGB standard that is intended for image rendering in moderately bright environments such as work offices with a background illumination of ≈350 lux. sRGB calls for a signal encoding exponent approximating α=0.45. If such an sRGB-encoded signal is subsequently decoded with a power exponent γ=2.4 then the end-to-end linearity power is ε≈1.1.

The three different viewing environments discussed above and their suggested end-to-end linearity power exponents can be curve-fitted and used to extrapolate to higher levels of ambient illumination. The trend is given by Eq(1), which is plotted in FIG. 4. Hence, once the ambient illumination level ($I_a$) has been measured then the desired end-to-end linearity power exponent (ε) can be determined from Eq(1). This relationship between $I_a$ and ε will be germane to certain aspects of the invention as described in following sections. The relationship given by Eq(1) is merely representative, and the invention is not dependent on the exact form of Eq(1). In general, the invention may implement any arbitrary relationship between $I_a$ and ε.

$$\varepsilon \approx 1+0.48 \cdot e^{-(0.0045 * I_a)} \qquad \text{Eq(1)}$$

It is noted in FIG. 4 that as the ambient illumination increases that the desired end-to-end power asymptotically approaches purely linear; i.e., ε→1. Above 1000 lux the power ε is essentially equal to 1. This is basically a statement that as the eye becomes adapted to full daylight conditions that the display should start to adhere to the principle of pure end-to-end luminance linearity as was previously discussed. However, few if any displays actually implement a power of ε≈1.

Alternatively, the function described by Eq(1) can be implemented in a discrete fashion, as illustrated in FIG. 5. The number of discretized levels illustrated in FIG. 5 is representative; the invention may implement an arbitrary number of discrete levels.

SUMMARY OF THE EXEMPLARY EMBODIMENTS

The exemplary embodiments herein utilize real-time measured data from an environmental light sensor along with stored characteristic display data to dynamically (in real-time) process and alter an image and/or video signal so that key display performance parameters such as brightness, black level, saturation, hue, and sharpness would be perceived as optimal, meaning they are tuned to their best intended rendering for the given viewing conditions. Other embodiments also provide the method by which a display is calibrated to perform as described as well as the method for performing the dynamic performance process.

The foregoing and other features and advantages of the present invention will be apparent from the following more detailed description of the particular embodiments, as illustrated in the accompanying drawings.

BRIEF DESCRIPTION OF THE DRAWINGS

A better understanding of an exemplary embodiment will be obtained from a reading of the following detailed description and the accompanying drawings wherein identical reference characters refer to identical parts and in which.

DETAILED DESCRIPTION

Figure 1:
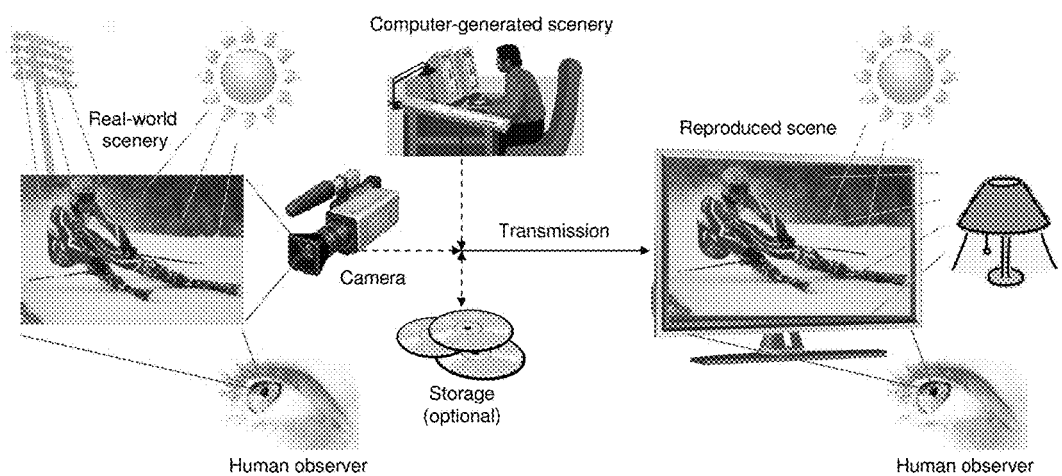
FIG. 1 is a graphical representation of a typical image reproduction process.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 6:
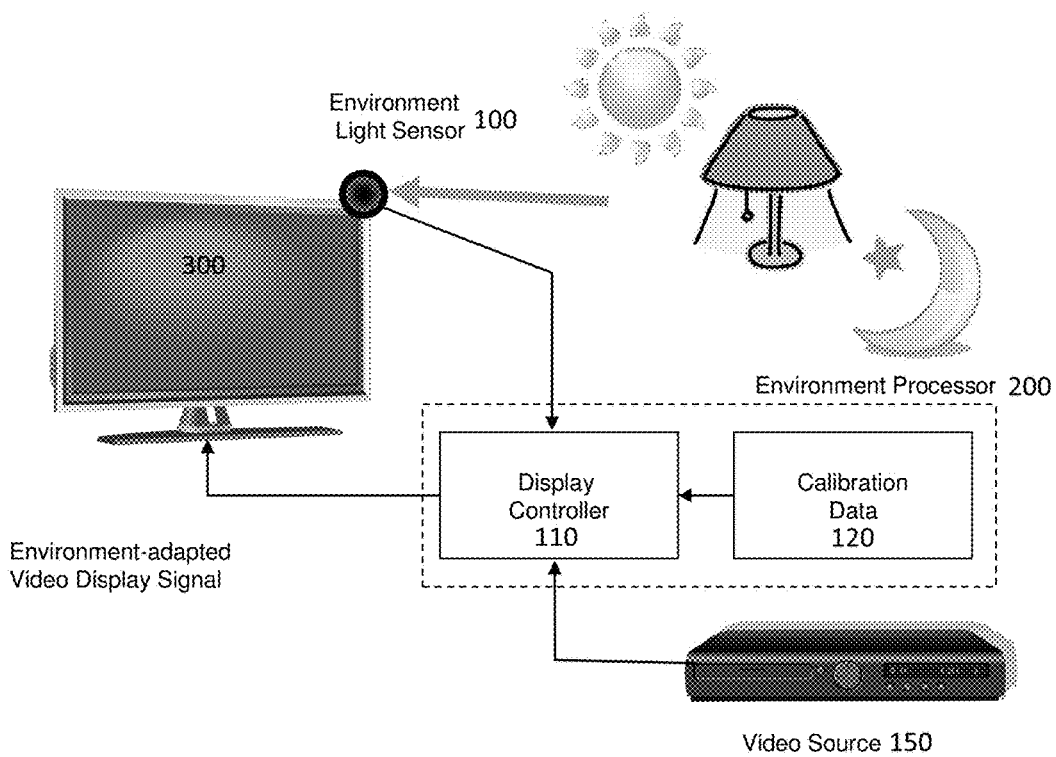
FIG. 6 is a block diagram for the basic elements in an embodiment of the invention.

FIG. 6 provides a schematic view of the basic components of an exemplary embodiment. Here, an environment light sensor 100 is in electrical communication with an environment processor 200, which obtains video data from a video source 150. The environmental processor 200 may contain several components, at least the display controller 110 and the calibration data 120. The environmental processor 200 is preferably then in electrical communication with the display 300. In some embodiments, it would be the display controller 110 that is in electrical communication with the environment light sensor 100, video source 150, and the display 300.

The video source 150 can be any number of devices which generate and/or transmit video data, including but not limited to television/cable/satellite transmitters, DVD/Blue Ray players, computers, video recorders, or video gaming systems. The environment light sensor 100 may be any opto-electronic device that converts the level of incoming light to a related electrical signal, and may also include spectral information as well. The display controller 110 may be any combination of hardware and software that utilizes the signal from the ambient light sensor and modifies the video signal based on the calibration data. The calibration data 120 is preferable a nonvolatile data storage which is accessible to the display controller that contains calibration data for the environment light sensor 100 and optionally including reflectance information for the display assembly. The display 300 can be any electronic device which presents an image to the viewer.

Brightness Adjustment

There are many applications where the desired brightness (i.e., maximum luminance) of a display may change, but perhaps the most obvious case is when displays are used outdoors. In this case the ambient light illumination that surrounds the display may vary anywhere from the dark of night to the full sun of midday—roughly a factor of ten million, or 7 orders of magnitude.

The operation of the human visual system (comprising the eye, optic nerve, and brain) is a very complex subject; indeed, there is not full consensus on its parametric performance by most of the leading experts in the field. The issue is exacerbated by the highly adaptive and non-linear nature of the human visual system. Hence, there is no utility in attempting to define specific visual capabilities in this disclosure. However, there are a few generalities on which everyone would agree. For one, the human visual system can adapt over a very wide range of light levels given some time to adapt, by perhaps as much as 12 orders of magnitude. However, there is a limit to the instantaneous dynamic range of human vision at any particular level of adaptation, perhaps 2-3 orders of magnitude (this varies with the absolute level of adaptation).

A specific adaptation level depends on the integrated field-of-view of the eye (nearly hemispherical) taking into account all viewable objects and sources of light in this range. Since a display will only occupy some fraction of the total field-of-view then the maximum brightness of the display should be varied to accommodate the overall adaptation of human vision to various light levels, which of course would include the light from the display itself. For example, a display that produces 500 candela per square meter (nits) might be painfully bright when viewing at nighttime or other dark environments (unless one walked up close enough to the display so that it mostly fills their field-of-view and then allows some time for proper adaptation to occur), but the same display would appear somewhat dim and unimpressive on a bright sunlit day, and in fact may have lower gray levels that are indiscernible.

Thus, in an exemplary embodiment the maximum luminance of a display is automatically controlled, depending at least upon the instantaneously measured level of ambient light. This issue has been addressed by U.S. Pat. No. 8,125,163 and is herein incorporated by reference in its entirety.

Black Level and Linearity Adjustment

Figure 7:
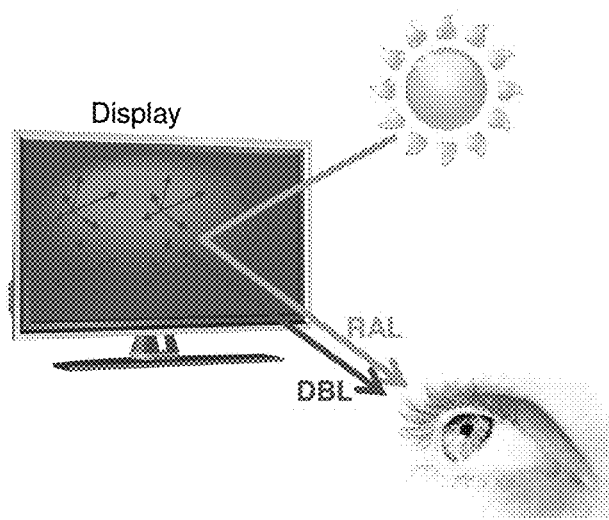
FIG. 7 is an illustration of reflected ambient light and its relationship with displayed light.

Any display will reflect ambient environmental light to a certain degree. In some instances the reflected light level may be high enough to substantially dominate the darker regions of the displayed image or video content (hereafter simply 'image'). When this occurs the visual details in the darker regions of the image are essentially "washed out". Said another way, the display cannot produce visually discernable brightness levels in an image that fall below the equivalent brightness level of the reflected ambient light. The general situation is illustrated in FIG. 7, where RAL is the effective brightness of the reflected ambient light and DBL is the displayed brightness level of any portion of an image. Wherever DBL <RAL in the image then there will be a discernable loss in image content in those regions. An analogy is not being able to hear quieter passages within music while listening in an environment that has excessive background noise. For this very reason most radio broadcasts transmit signals that have a compressed dynamic range for improved "perceptual" listening in the noisy environment of a car.

To recover the visual discernment of darker regions within the image one may artificially raise the black level (i.e., lowest output) of the image signal so that the displayed brightness of the black level is more or less equal to the effective brightness of the reflected ambient light. This is equivalent to creating a signal-to-noise ratio >1 for all displayed light levels vs. the reflected ambient light. As a result a pure black region in the original image would become a specific level of dark gray depending on the ambient light level; i.e., the dynamic range of the image is compressed.

Figure 4:
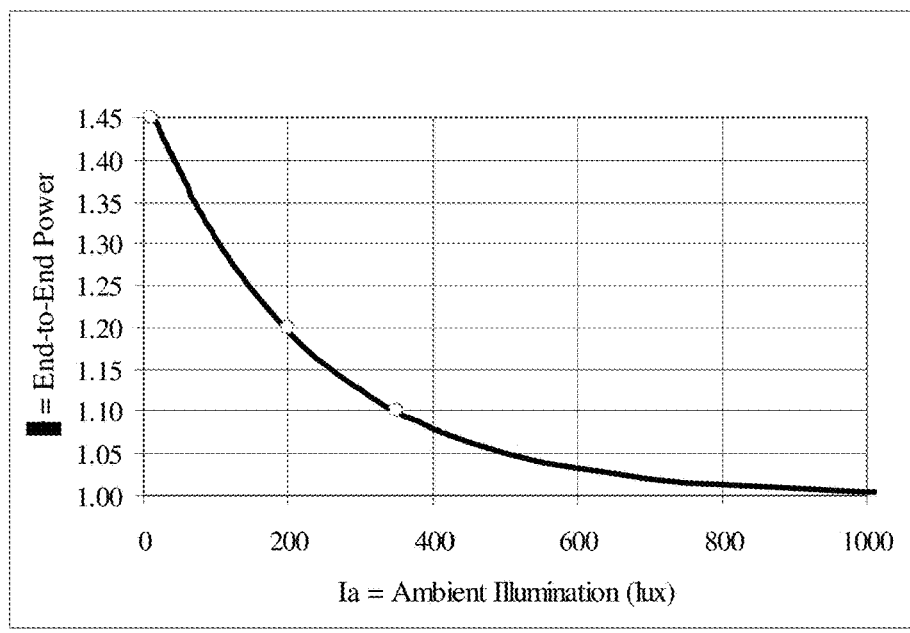
FIG. 4 is a graphical representation of end-to-end power vs. ambient illumination.
Figure 5:
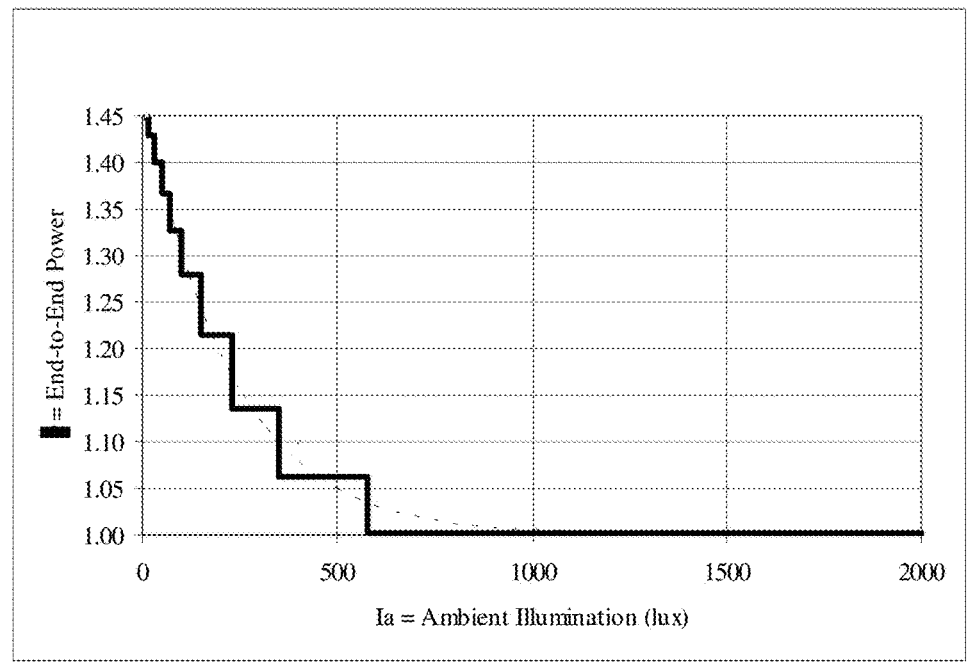
FIG. 5 is a graphical representation of end-to-end power vs. ambient illumination in a discrete implementation.

In addition to raising the black level, one may also alter the end-to-end linearity of the display system in order to enhance the contrast of select regions of the gray scale (also known as tone scale) depending on the specific application and rendering intent. This could be based on the previous Eq(1), as illustrated in FIG. 4 and FIG. 5, or any other defined relationship.

For outdoor applications and certain indoor applications the amount of ambient light that is reflected from a display will vary almost continuously depending on the time of day and other operating conditions (e.g., weather, shadowing effects, mood lighting, etc.). Therefore, an exemplary embodiment of the invention provides a means of automatically adjusting the black level and the linearity of a display according to pre-defined rules, such as but not limited to those previously discussed.

It is noted that in darkened theater or similar environments there is little or no reflected ambient light from the display, in which case there is no specific need to raise the black level of the image, although it may still be desired to alter the end-to-end linearity of images in certain applications; for example, artistic liberty in digital signage.

Figure 2:
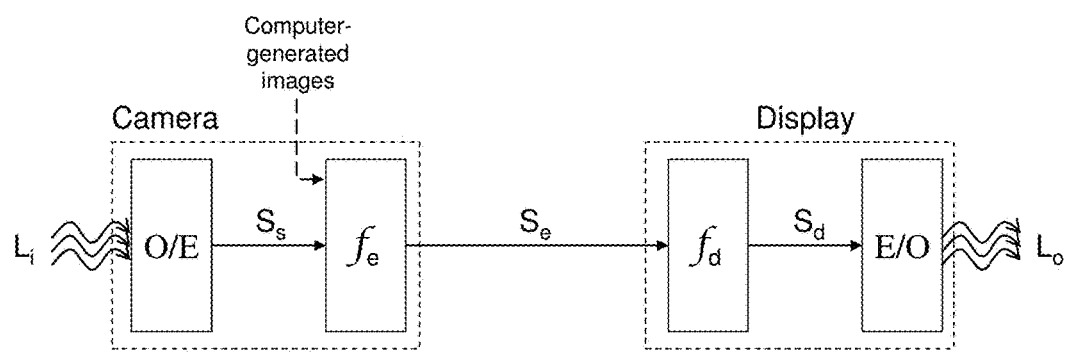
FIG. 2 is a block diagram for a signal encoding and decoding process.
Figure 3:
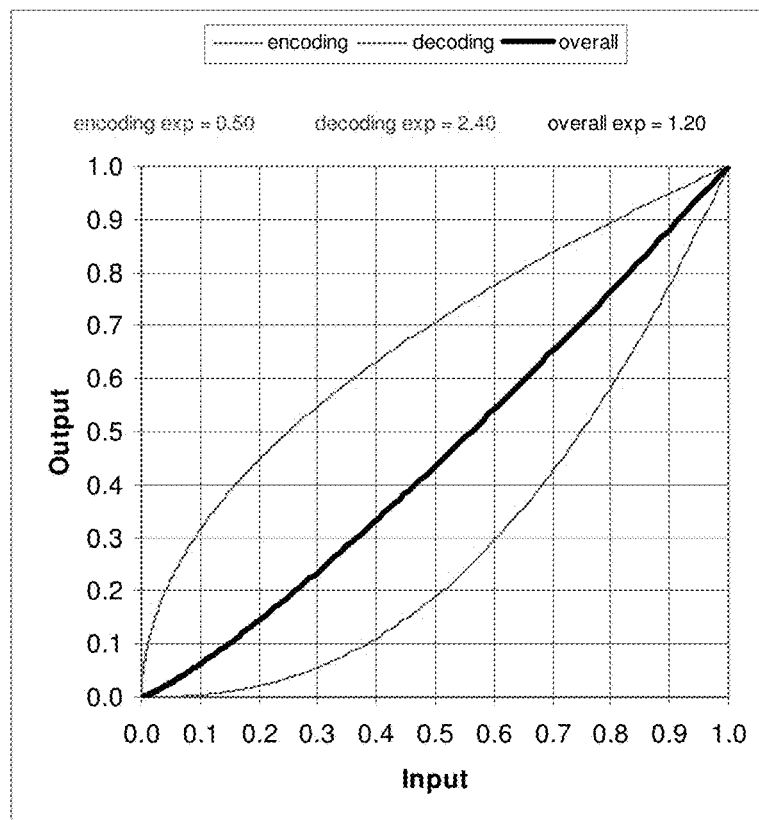
FIG. 3 is a graphical representation of image signal transformations per ITU-R BT.709/1886.
Figure 8:
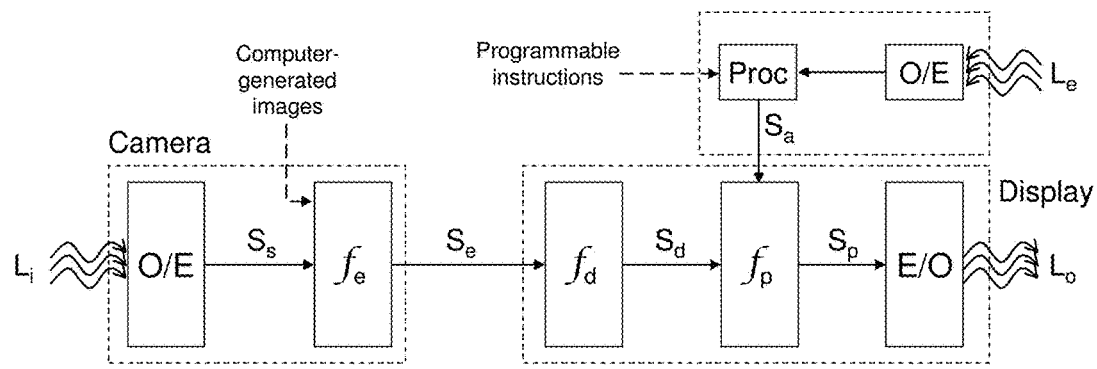
FIG. 8 is block diagram for an embodiment using post-decoding adjustment of black level and/or linearity.

The conceptually and functionally easiest location to perform autonomous black level and linearity adjustments are after the normal image signal decoding process, as generally illustrated in FIG. 8. In this figure the signal flow is similar to that described previously in FIG. 2, except that now a new signal processing block labeled $f_p$ has been inserted into the signal flow for the purposes of providing automatic, real-time image signal adjustment in response to varying environmental conditions (i.e., an environmentally-reactive adjustment). The processing block represented by $f_p$ can be viewed as a post-decoding processor since it operates after the normal signal decoding processor that is represented by $f_d$.

In FIG. 8 a light sensor converts environmental light levels $L_e$ to an electrical signal in a typically linear optical-to-electrical (O/E) conversion process. The output of this sensor feeds into an environmental processing unit labeled 'Proc' that contains at minimum a lookup table and/or computational algorithms that determine the desired display black level relative to the measured ambient light level. Additionally the environmental processor may contain a lookup table and/or computational algorithms for image signal linearity modification (e.g., a power function) relative to the measured ambient light level. Also, a provision to add real-time programmable instructions to the environmental processor is shown. The programmable instructions can be used in a wide variety of ways, including but not limited to altering or overriding the environmental-based processing depending on time-of-day, display content, etc. In summary, the environmental processor output signal $S_a$ contains the instantaneous value of the desired display black level $S_b$ and optionally a signal linearity modification value that, for the case of a simple power function, takes the form of an exponent herein called $\beta$.

Still referring to FIG. 8, the decoded image signal $S_d$ and environmentally-reactive control signal $S_a$ are fed into the image signal processing block labeled $f_p$ which, in an exemplary embodiment, produces a final display driving signal $S_p$ according to Eq(2) below. This equation assumes that the all three image signal transformations (encoding, decoding, and post-decoding) are performed with power law functions. Signal encoding and decoding with power law functions, are typical in the industry, although this is not a necessity for the invention as other functions may be used with various embodiments herein. The right-hand side of Eq(2) represents the processing functionality of block $f_p$, accepting the input signals $S_a$ and $S_e$ and outputting the signal $S_p$.

$$S_p = S_b + (1 - S_b) \cdot S_d^{\left(\frac{\beta}{\alpha\gamma}\right)} \qquad \text{Eq (2)}$$

α=signal encoding power exponent (assuming power law encoding)
γ=signal decoding power exponent (assuming power law decoding) $S_b$ and β are contained in the environmentally-reactive control signal $S_a$:
$S_b$=desired black level offset as a fraction of the full-scale signal
β=linearity modifier power exponent (assuming power law modification)

If the encoding exponent α and the decoding exponent γ are known quantities, as assumed in Eq(2), then the final end-to-end signal linearity is determined solely by the value of the linearity modifier exponent β; i.e., β is equivalent to the previously defined end-to-end linearity power exponent ε. The encoding exponent α is typically known based on the source of the image data, and the decoding exponent γ is either given by the manufacturer of the display and/or can be determined by testing. Eq(2) offers a specific example of the processes described in this section based on a specific method of signal encoding/decoding, but the general process is the same for any other method of encoding/decoding.

Figure 9:
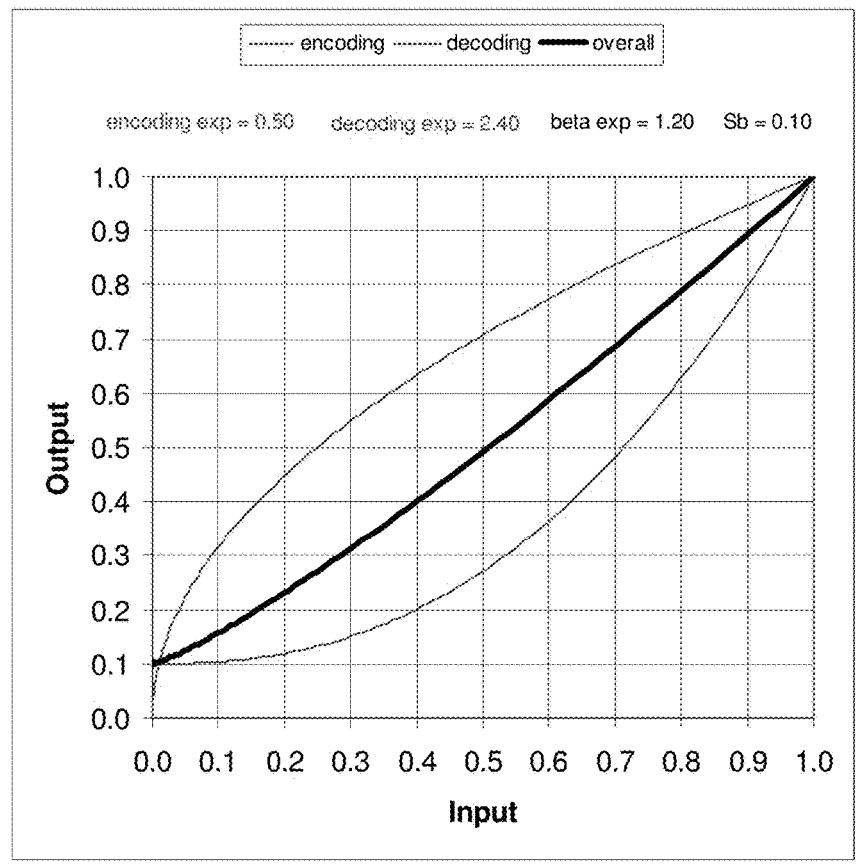
FIG. 9 is a graphical representation of example signal transforms of FIG. 8 using Equation (2).

The functionality of Eq(2) is illustrated in FIG. 9. Here, the encoding process is a single power law transformation with an exponent α=0.50 (as approximated by ITU-R BT.709-5), and the decoding process is a single power law transformation with an exponent γ=2.40 (per ITU-R BT.1886). For this example the requested black level has been set at 0.1 and the linearity modifier exponent β has been set to 1.20. The effective decoding transformation is given by the lower curve, and the end-to-end signal transformation is given by the middle curve which exhibits the desired black level offset of 0.1 and a slightly drooped linearity that is consistent with an end-to-end signal transform power of ε=1.20.

Figure 10:
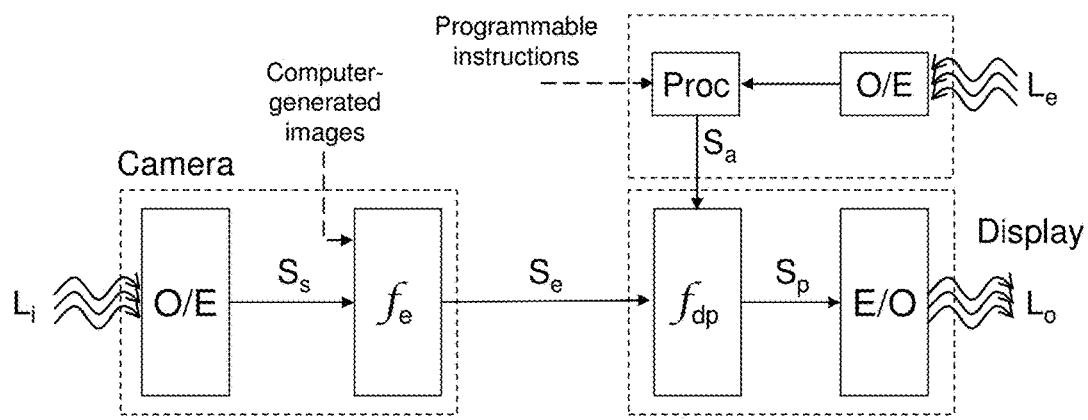
FIG. 10 is a block diagram of an alternate embodiment for post-decoding adjustment.

Alternatively, the functionality of the image signal decoding block $f_d$ could be absorbed into the environmental processor block $f_p$ as a new processing block labeled $f_{dp}$, as shown in FIG. 10.

In FIG. 10 the display driving signal $S_p$ is formed by Eq(3)

$$S_p = S_b + (1 - S_b) \cdot S_e^{\left(\frac{\beta^*}{\alpha}\right)} \qquad \text{Eq (3)}$$

Where β*=β/γ, and all other parameters are defined as before. Eq(3) possesses the same functionality as Eq(2) and hence produces the same results as shown in FIG. 9.

Figure 11:
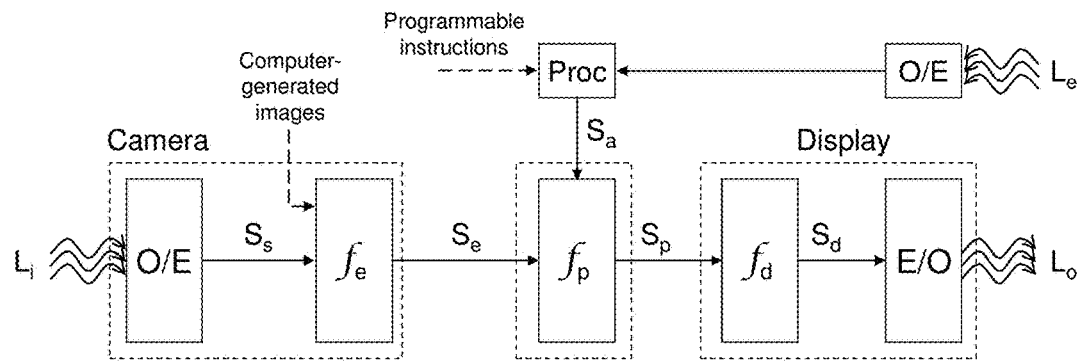
FIG. 11 is a block diagram of an embodiment for pre-decoding adjustment of black level and/or linearity.

In certain instances it is more convenient, or even necessary, to perform black level and/or linearity adjustments prior to the normal signal decoding transformation. The general process is illustrated in FIG. 11. In this figure it is seen that the environmentally-reactive image signal processing function, represented by $f_p$, has been moved ahead of the normal image signal decoder function represented by $f_d$. In this manner $f_p$ can be viewed as a pre-decoding function.

Referring to FIG. 11, the encoded image signal $S_e$ and environmentally-reactive control signal $S_a$ are fed into the image signal processing block labeled $f_p$ which, in an exemplary embodiment, produces a final display driving signal $S_p$ according to Eq(4) below. This equation assumes that the all three image signal transformations (encoding, pre-decoder processing, and decoding) are performed with power law functions. Signal encoding and decoding with power law functions, are typical in the industry, although this is not a necessity for any of the embodiments herein. The right-hand side of Eq(4) represents the processing functionality of block $f_p$, accepting the input signals $S_a$ and $S_e$ and outputting the signal $S_p$.

$$S_p = \left[S_b + (1 - S_b) \cdot S_e^{\left(\frac{\beta}{\alpha}\right)}\right]^{\frac{1}{\gamma}} \qquad \text{Eq (4)}$$

α=signal encoding power exponent (assuming power law encoding)
γ=signal decoding power exponent (assuming power law decoding) $S_b$ and β are contained in the environmentally-reactive control signal $S_a$:
$S_b$=desired black level offset as a fraction of the full-scale signal
β=linearity modifier power exponent (assuming power law modification)

If the encoding exponent α and the decoding exponent γ are known quantities, as assumed in Eq(4), then the final signal linearity is determined solely by the value of the linearity modifier exponent β; i.e., β is equivalent to the previously defined end-to-end linearity power exponent ε. The encoding exponent α is typically known based on the source of the image data, and the decoding exponent γ is either given by the manufacturer of the display and/or can be determined by testing. Eq(4) offers a specific example of the processes described in this section based on a specific method of signal encoding/decoding, but the general process is the same for any other method of encoding/decoding.

Figure 12:
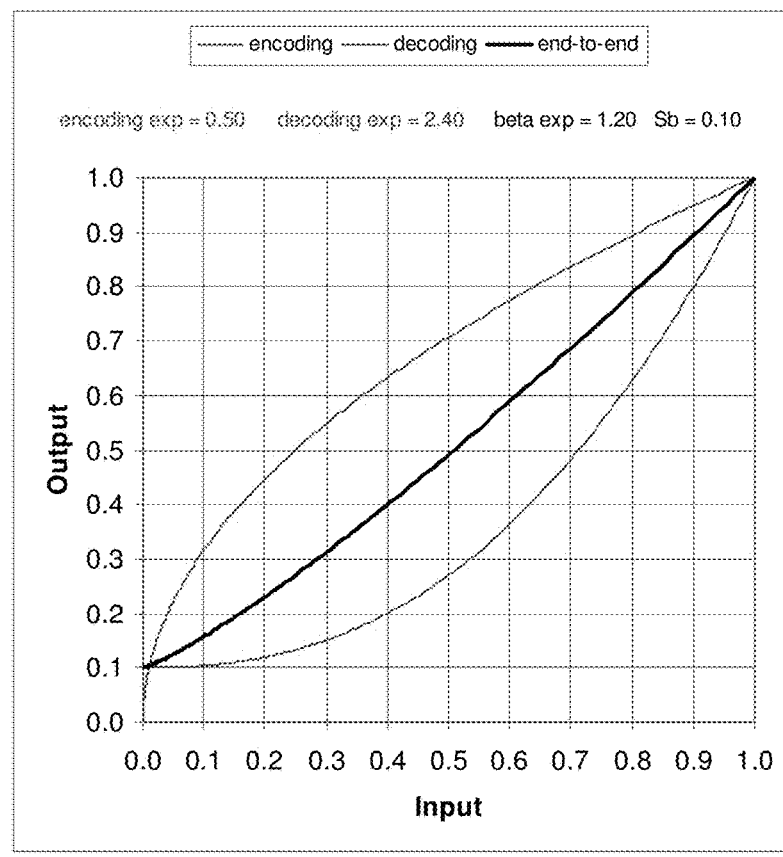
FIG. 12 is a graphical representation of example signal transforms of FIG. 11 using Equation (4).

An example of the functionality of Eq(4) is illustrated in FIG. 12. Here, the encoding process is a single power law transformation with an exponent α=0.50 (as approximated by ITU-R BT.709-5), and the decoding process is a single power law transformation with an exponent γ=2.40 (per ITU-R BT.1886). For this example the requested black level has been set at 0.1 and the linearity modifier exponent β has been set to 1.20. The effective decoding transformation is given by the lower curve, and the end-to-end signal transformation is given by the middle curve which exhibits the desired black level offset of 0.1 and a slightly drooped linearity that is consistent with an end-to-end signal transform power of ε=1.20. As expected, FIG. 12 appears identical to FIG. 9 because the same black level ($S_b$) and linearity modifier (β) have been requested in both cases.

One may modify the scenarios described in the previous sections in order to maintain and/or reduce gray levels below a certain threshold. A primary reason for doing this is to retain the attractive power-saving attributes of backlight dynamic dimming in liquid crystal displays (LCD). Dynamic dimming has been addressed by co-pending application Ser. No. 12/793,474 filed on Jun. 3, 2010 and is fully incorporated herein by reference in its entirety.

For the purposes of illustration the embodiment described in this section will assume a pre-decoder processor as shown previously in FIG. 11.

Exemplary Embodiment 1

Referring to FIG. 11 the encoded image signal $S_e$ and environmentally-reactive control signal $S_a$ are fed into the image signal processing block labeled $f_p$ which, in an exemplary embodiment, produces a pre-decoding image signal $S_p$ according to Eq(5) below. This equation assumes that the all three image signal transformations (encoding, pre-decoder processing, and decoding) are performed with power law functions, although this is not a necessity for the invention. Eq(5) represents the processing functionality of block $f_p$, accepting the input signals $S_a$ and $S_e$ and outputting the signal $S_p$. A new feature of this embodiment is the introduction of a gray level threshold labeled $S_t$, leading to the two conditional cases expressed in Eq(5). The $1^{st}$ condition is applicable when encoded signal levels fall below a level that is derived from $S_t$, in which case those signal levels will be set to 0 (i.e., full black). Otherwise, the $2^{nd}$ condition in Eq(5) is applicable for encoded signal levels that fall above the level derived from $S_t$.

$$\text{1) for } S_e \leq (S_t)^\alpha: S_p = 0 \qquad \text{Eq (5)}$$

$$\text{2) for } S_e > (S_t)^\alpha: S_p = \left\{ S_b + \frac{\left((S_e)^{\frac{1}{\alpha}} - S_t\right)^\beta}{(1-S_t)^\beta}(1-S_b) \right\}^{\frac{1}{\gamma}}$$

$\alpha$=signal encoding power exponent (assuming power law encoding)
$\gamma$=signal decoding power exponent (assuming power law decoding) $S_t$, $S_b$, and $\beta$ are contained in the environmentally-reactive control signal $S_a$:
$S_t$=desired gray level threshold as a fraction of the full-scale input signal
$S_b$=desired black level offset as a fraction of the full-scale output signal
$\beta$=linearity modifier power exponent (assuming power law modification)

The gray level threshold ($S_t$) may be: 1) an environmentally-reactive variable determined via a lookup table or computational algorithms within the processing block labeled 'Proc', or 2) provided by the 'programmable instructions' port on 'Proc', or 3) be a fixed value pre-programmed within 'Proc', or 4) any combination of the above. Alternatively, $S_t$ may be a fixed value within the $f_p$ processing block.

If the encoding exponent $\alpha$ and the decoding exponent $\gamma$ are known quantities, as assumed in Eq(5), then the final signal linearity beyond the gray level threshold $S_t$ is determined solely by the value of the linearity modifier exponent $\beta$; i.e., $\beta$ is equivalent to the previously defined end-to-end linearity power exponent $\varepsilon$. The encoding exponent $\alpha$ is typically known based on the source of the image data, and the decoding exponent $\gamma$ is either given by the manufacturer of the display and/or can be determined by testing. Eq(5) offers a specific example of the processes described in this section based on a specific method of signal encoding/decoding, but the general process is the same for any other method of encoding/decoding.

Figure 13:
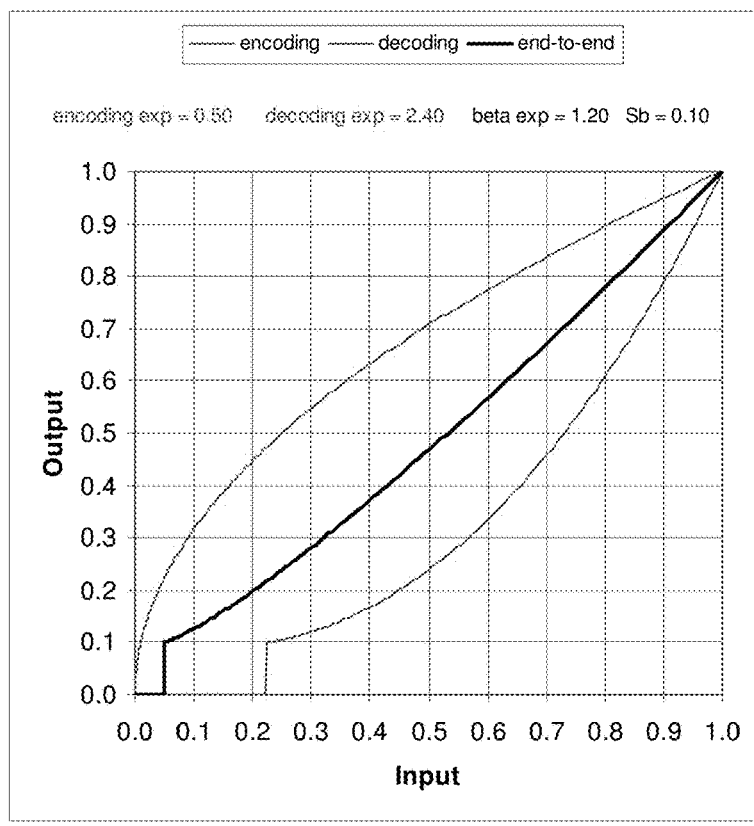
FIG. 13 is graphical representation of example signal transforms of FIG. 11 using Equation (5).

An example of the functionality of Eq(5) is illustrated in FIG. 13. Here, the encoding process is a single power law transformation with an exponent $\alpha$=0.50 (as approximated by ITU-R BT.709-5), and the decoding process is a single power law transformation with an exponent $\gamma$=2.40 (per ITU-R BT.1886). For this example the requested black level has been set at 0.1, the requested black level threshold has been set to 0.05, and the linearity modifier exponent $\beta$ has been set to 1.20. The effective decoding transformation is given by the lower curve, and the end-to-end signal transformation is given by the middle curve which exhibits the desired black level offset of 0.1 at a threshold of 0.05, and a slightly drooped linearity that is consistent with an end-to-end signal transform power of $\varepsilon$=1.20.

Exemplary Embodiment 2

The "cliff" type of threshold cutoff produced by Eq(5) and illustrated in FIG. 13 may produce objectionable visual artifacts in the image, especially for higher levels of thresholds and/or black level offsets. This would manifest as darker regions in an image that suddenly and unnaturally become black—this a phenomena that is sometimes referred to as banding. This effect can be reduced by softening the edge of the threshold.

Referring back to FIG. 11 the encoded image signal $S_e$ and environmentally-reactive control signal $S_a$ are fed into the image signal processing block labeled $f_p$ which, in an exemplary embodiment, produces a pre-decoding image signal $S_p$ according to Eq(6) below. This equation assumes that the all three image signal transformations (encoding, pre-decoder processing, and decoding) are performed with power law functions, although this is not a necessity for the invention. Eq(6) represents the processing functionality of block $f_p$, accepting the input signals $S_a$ and $S_e$ and outputting the signal $S_p$. A new feature of this embodiment is the introduction of a gray level turn-off point labeled $S_o$, leading to the three conditional cases expressed in Eq(6). The $1^{st}$ condition is applicable when the encoded signal levels fall below a level that is derived from $S_o$, in which case those signal levels are set to 0 (i.e., full black). Next, for encoded signal levels that fall above the level derived from $S_o$ but below the threshold level derived from $S_t$ then the $2^{nd}$ condition in Eq(6) is applicable. Otherwise, the $3^{rd}$ condition in Eq(6) is applicable for encoded signal levels that fall above the level derived from $S_t$. The $2^{nd}$ condition is used to soften the transition between the raised black level and the full off level by creating a linear ramp in the display drive signal ($S_d$) between $S_o$ (drive level=0) to $S_t$ (drive level=$S_b$).

$$\text{1) for } S_e \leq (S_o)^\alpha: S_p = 0 \qquad \text{Eq (6)}$$

$$\text{2) for } (S_o)^\alpha < S_e < (S_t)^\alpha: S_p = \left\{ \left(\frac{S_b}{S_t - S_o}\right)\left((S_e)^{\frac{1}{\alpha}} - S_o\right) \right\}^{\frac{1}{\gamma}}$$

$$\text{3) for } S_e \geq (S_t)^\alpha: S_p = \left\{ S_b + \frac{\left((S_e)^{\frac{1}{\alpha}} - S_t\right)^\beta}{(1-S_t)^\beta}(1-S_b) \right\}^{\frac{1}{\gamma}}$$

$\alpha$=signal encoding power exponent (assuming power law encoding)
$\gamma$=signal decoding power exponent (assuming power law decoding) $S_o$, $S_t$, $S_b$, and $\beta$ are contained in the environmentally-reactive control signal $S_a$:
$S_o$=desired gray level turn-off point as a fraction of the full-scale input signal
$S_t$=desired gray level threshold as a fraction of the full-scale input signal $S_b$=desired black level offset as a fraction of the full-scale output signal $\beta$=linearity modifier power exponent (assuming power law modification)

The gray level turn-off point ($S_o$) and gray level threshold ($S_t$) may be: 1) environmentally-reactive variables determined via a lookup table or computational algorithms within the processing block labeled 'Proc', or 2) provided by the 'programmable instructions' port on 'Proc', or 3) be fixed values pre-programmed within 'Proc', or 4) any combination of the above. Alternatively, $S_o$ and $S_t$ may be fixed values within the $f_p$ processing block.

If the encoding exponent $\alpha$ and the decoding exponent $\gamma$ are known quantities, as assumed in Eq(6), then the final signal linearity beyond the gray level threshold $S_t$ is determined solely by the value of the linearity modifier exponent $\beta$; i.e., $\beta$ is equivalent to the previously defined end-to-end linearity power exponent c. The encoding exponent $\alpha$ is typically known based on the source of the image data, and the decoding exponent $\gamma$ is either given by the manufacturer of the display and/or can be determined by testing. Eq(6) offers a specific example of the processes described in this section based on a specific method of signal encoding/decoding, but the general process is the same for any other method of encoding/decoding.

Figure 14:
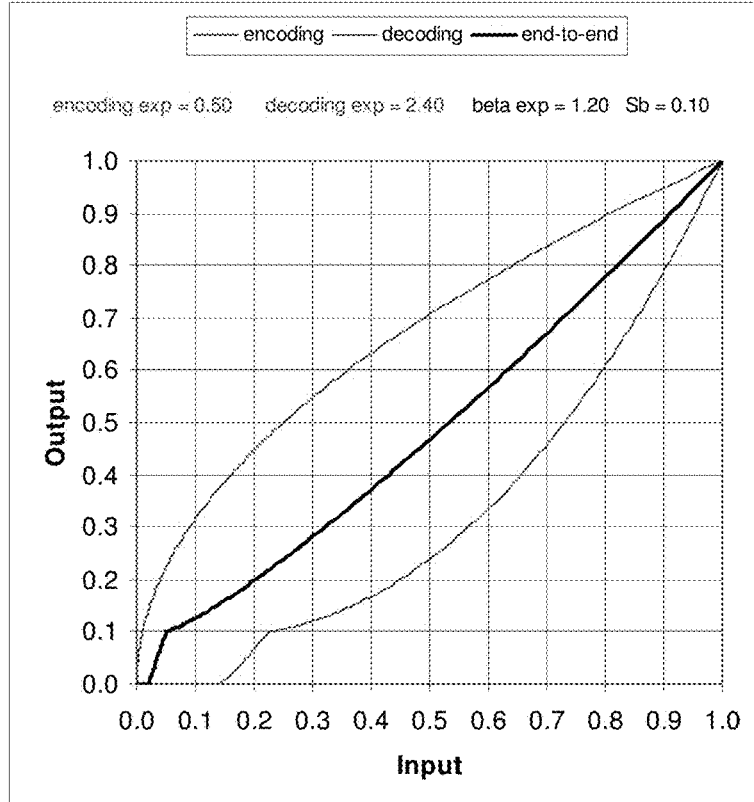
FIG. 14 is graphical representation of example signal transforms of FIG. 11 using Equation (6).

An example of the functionality of Eq(6) is illustrated in FIG. 14. Here, the encoding process is a single power law transformation with an exponent $\alpha$=0.50 (as approximated by ITU-R BT.709-5), and the decoding process is a single power law transformation with an exponent $\gamma$=2.40 (per ITU-R BT.1886). For this example the requested black level offset has been set at 0.1, the requested gray level turn-off has been set to 0.02, the gray level threshold has been set to 0.05, and the linearity modifier exponent $\beta$ has been set to 1.20. The effective decoding transformation is given by the lower curve, and the end-to-end signal transformation is given by the middle curve which exhibits the desired black level offset of 0.1, a gray level turn-off of 0.02, and gray level threshold of 0.05, and a slightly drooped linearity that is consistent with an end-to-end signal transform power of $\epsilon$=1.20. The linear ramp between ($S_o$, 0) and ($S_t$, $S_b$) serve to reduce the aforementioned banding effect.

Exemplary Embodiment 3

The linear ramp provided as a transition between full off and threshold in the previous embodiment affords a significant reduction in visual artifacts, or banding, but there is still a sharp point in the end-to-end transform curve shown in FIG. 14 that has the potential to produce visual artifacts. To further improve the transition, a specific example using a sine curve will be described below, although other functions could be used.

Referring back to FIG. 11 the encoded image signal $S_e$ and environmentally-reactive control signal $S_a$ are fed into the image signal processing block labeled $f_p$ which, in an exemplary embodiment, produces a pre-decoding image signal $S_p$ according to Eq(7) below. This equation assumes that the all three image signal transformations (encoding, pre-decoder processing, and decoding) are performed with power law functions, although this is not a necessity for the invention. Eq(7) represents the processing functionality of block $f_p$, accepting the input signals $S_a$ and $S_e$ and outputting the signal $S_p$. A new feature of this embodiment is the introduction of a gray level turn-off point labeled $S_o$, leading to the three conditional cases expressed in Eq(7). The 1$^{st}$ condition is applicable when the encoded signal levels fall below a level that is derived from $S_o$, in which case those signal levels are set to 0 (i.e., full black). Next, for encoded signal levels that fall above the level derived from $S_o$ but below the threshold level derived from $S_t$ then the 2$^{nd}$ condition in Eq(7) is applicable. Otherwise, the 3$^{rd}$ condition in Eq(7) is applicable for encoded signal levels that fall above the level derived from $S_t$. The 2$^{nd}$ condition is used to soften the transition between the raised black level and the full off level by creating a sine-curve ramp in the display drive signal ($S_d$) between $S_o$ (drive level=0) to $S_t$ (drive level=$S_b$).

$$\text{1) for } S_e \leq (S_o)^\alpha: S_p = 0 \qquad \text{Eq (7)}$$

$$\text{2) for } (S_o)^\alpha < S_e < (S_t)^\alpha: S_p = \left\{ S_b \cdot \sin\left[\frac{\pi}{2}\left(\frac{(S_e)^{\frac{1}{\gamma}} - S_o}{S_t - S_o}\right)\right] \right\}^{\frac{1}{\gamma}}$$

$$\text{3) for } S_e \geq (S_t)^\alpha: S_p = \left\{ S_b + \frac{\left((S_e)^{\frac{1}{\alpha}} - S_t\right)^\beta}{(1 - S_t)^\beta}(1 - S_b) \right\}^{\frac{1}{\gamma}}$$

$\alpha$=signal encoding power exponent (assuming power law encoding)

$\gamma$=signal decoding power exponent (assuming power law decoding) $S_o$, $S_t$, $S_b$ and $\beta$ are contained in the environmentally-reactive control signal $S_a$:

$S_o$=desired gray level turn-off point as a fraction of the full-scale input signal $S_t$=desired gray level threshold as a fraction of the full-scale input signal $S_b$=desired black level offset as a fraction of the full-scale output signal $\beta$=linearity modifier power exponent (assuming power law modification)

The gray level turn-off point ($S_o$) and gray level threshold ($S_t$) may be: 1) environmentally-reactive variables determined via a lookup table or computational algorithms within the processing block labeled 'Proc', or 2) provided by the 'programmable instructions' port on 'Proc', or 3) be fixed values pre-programmed within 'Proc', or 4) any combination of the above. Alternatively, $S_o$ and $S_t$ may be fixed values within the $f_p$ processing block.

If the encoding exponent $\alpha$ and the decoding exponent $\gamma$ are known quantities, as assumed in Eq(7), then the final signal linearity beyond the gray level threshold $S_t$ is determined solely by the value of the linearity modifier exponent $\beta$; i.e., $\beta$ is equivalent to the previously defined end-to-end linearity power exponent c. The encoding exponent $\alpha$ is typically known based on the source of the image data, and the decoding exponent $\gamma$ is either given by the manufacturer of the display and/or can be determined by testing. Eq(7) offers a specific example of the processes described in this section based on a specific method of signal encoding/decoding, but the general process is the same for any other method of encoding/decoding.

Figure 15:
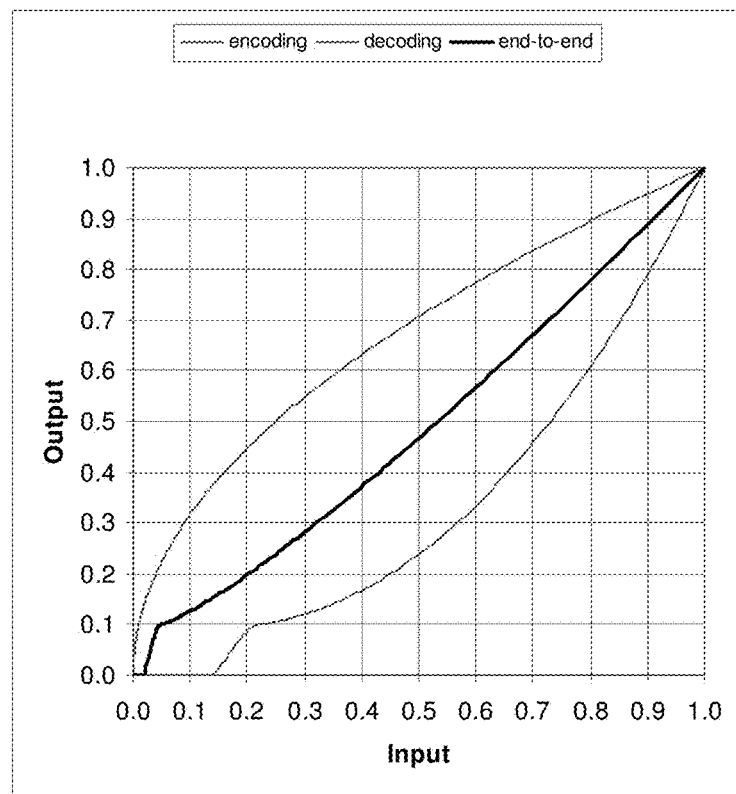
FIG. 15 is graphical representation of example signal transforms of FIG. 11 using Equation (7).

An example of the functionality of Eq(7) is illustrated in FIG. 15. Here, the encoding process is a single power law transformation with an exponent $\alpha$=0.50 (as approximated by ITU-R BT.709-5), and the decoding process is a single power law transformation with an exponent $\gamma$=2.40 (per ITU-R BT.1886). For this example the requested black level offset has been set at 0.1, the requested gray level turn-off has been set to 0.02, the gray level threshold has been set to 0.05, and the linearity modifier exponent $\beta$ has been set to 1.20. The effective decoding transformation is given by the lower curve, and the end-to-end signal transformation is given by the middle curve which exhibits the desired black level offset of 0.1, a gray level turn-off of 0.02, and gray level threshold of 0.05, and a slightly drooped linearity that is consistent with an end-to-end signal transform power of ε=1.20.

Figure 16:
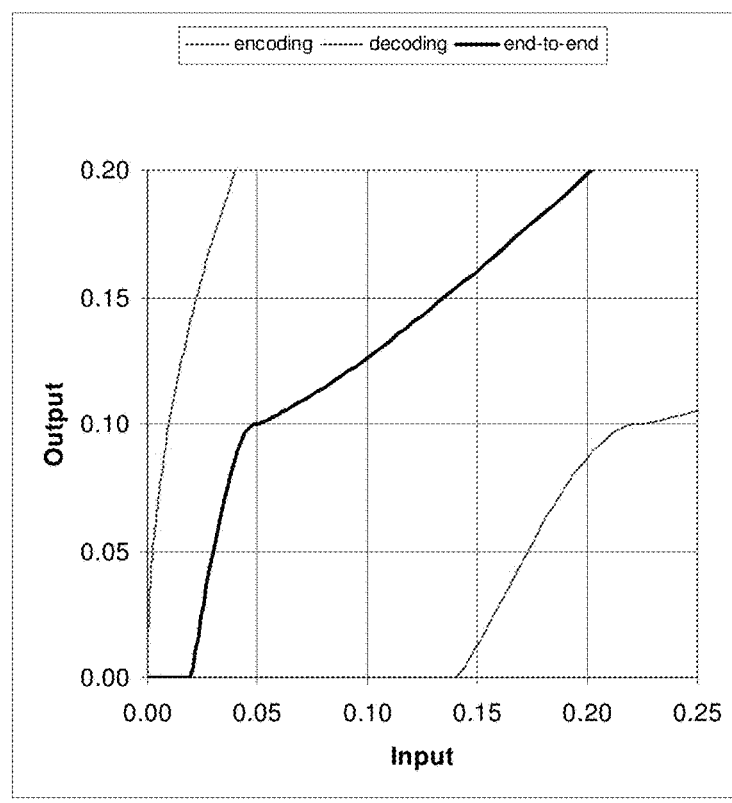
FIG. 16 is a detailed view of the lower left hand corner of FIG. 15.

A close-up of the lower left-hand corner of FIG. 15 is shown below in FIG. 16. This shows a smoother transition of the end-to-end signal transform at the gray level threshold, in this case at $S_t$=0.05.

It bears repeating that all examples provided in this section are provided solely for the clarification of the general principles of the invention, and do not limit the scope of the invention. In particular, functions other than the sine function may be used in Eq(7) to provide "tangential-matching" of the slopes of the curves at the threshold point for further improvement of gray level processing in this region.

Exemplary Embodiment 4

The embodiment described in this section illustrates the implementation of autonomous black level and linearity adjustment using a very common industry-standard method of image encoding: ITU-R BT.709-5 (2002), and image decoding: ITU-R BT.1886 (2011). This embodiment also serves to generally illustrate how this invention may be adapted to any encoded/decoded signal transformation formats.

The BT.709 encoding process is described by Eq(8). The 1$^{st}$ condition in Eq(8) is intended to prevent a nearly infinite slope in the transform function for small signals (i.e., darkest gray levels), as would be the case for a purely power-law function, that would be problematic for noise at such low levels.

$$S_e = \begin{cases} 1)\ 4.5 \cdot S_s & \text{if } S_s < 0.018 \\ 2)\ 1.099 \cdot S_s^\alpha - 0.099 & \text{if } S_s \geq 0.018\ (\text{where } \alpha = 0.45) \end{cases} \quad \text{Eq (8)}$$

The BT.1886 decoding process is simply a power-law transformation as described by Eq(9).

$$S_d = S_p^\gamma (\text{where } \gamma = 2.40) \quad \text{Eq (9)}$$

Referring back to FIG. 11, the encoded image signal $S_e$ and environmentally-reactive control signal $S_a$ are fed into the image signal processing block labeled $f_p$, which, in an exemplary embodiment, produces a pre-decoding image signal $S_p$ according to Eq(10) below which represents the processing functionality of block $f_p$, accepting the input signals $S_a$ and $S_e$ and outputting the signal $S_p$. The break point at $S_s$=0.018 in the encoding process described by Eq(8) leads to the two sets of conditional cases as expressed in Eq(10). The 1$^{st}$ set of conditions is applicable when the encoded signal level $S_e$ falls below the value of 0.081 (=4.5×0.018), leading to three sub-conditions 1a-1c that are dependent on the encoded signal level $S_e$ relative to the black level transition parameters $S_o$ and $S_t$. The 2$^{nd}$ set of conditions in Eq(10) is applicable when the encoded signal level $S_e$ is greater than 0.081, leading to three more sub-conditions 2a-2c that are dependent on the encoded signal level $S_e$ relative to the black level transition parameters $S_o$ and $S_t$. In Eq(10) a sine function has been implemented for the black level transition for conditions 1b and 2b, although there many functions that could be used for this purpose.

$$\text{Eq (10)}$$

1) for $S_e < 0.081$: a) if $\frac{S_e}{4.5} \leq S_o$: $S_p = 0$ b) if $S_o < \frac{S_e}{4.5} < S_t$: $S_p = \left\{ S_b \cdot \sin\left[\frac{\pi}{2}\left(\frac{S^* - S_o}{S_t - S_o}\right)\right] \right\}^{\frac{1}{\gamma}}$ c) if $\frac{S_e}{4.5} \geq S_t$: $S_p = \left\{ S_b + \frac{(S^* - S_t)^\beta}{(1 - S_t)^\beta}(1 - S_b) \right\}^{\frac{1}{\gamma}}$ 2) for $S_e \geq 0.081$: a) if $S^* \leq S_o$: $S_p = 0$ b) if $S_o < S^* < S_t$: $S_p = \left\{ S_b \cdot \sin\left[\frac{\pi}{2}\left(\frac{S^* - S_o}{S_t - S_o}\right)\right] \right\}^{\frac{1}{\gamma}}$ c) if $S^* \geq S_t$: $S_p = \left\{ S_b + \frac{(S^* - S_t)^\beta}{(1 - S_t)^\beta}(1 - S_b) \right\}^{\frac{1}{\gamma}}$ where: $S^* = \left(\frac{S_e + 0.099}{1.099}\right)^{\frac{1}{\gamma}}$ In addition, depending on the spectral distribution of the ambient light it may be desirable to automatically alter the white balance of the display.

Regarding the calibration data, at the factory the reflectance characteristics of the LCD will be measured and stored in nonvolatile memory. In addition, the ambient light sensor will be calibrated to a known light standard.

Once the product is in the field, the display controller will continually analyze data from the light sensor and calculate the amount of light being reflected from the front of the LCD using the factory stored reflectance data.

Having shown and described a preferred embodiment of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

We claim:

1. A system for altering characteristics of a display based on environmental data, the system comprising:
   a light sensor;
   an environmental processor adapted to receive electrical signals from the light sensor and generate an environmentally-reactive control signal ($S_a$);
   an image signal processor adapted to accept $S_a$ and an encoded image signal ($S_e$) and generate a pre-decoding image signal ($S_p$); and
   an image signal decoder adapted to accept $S_p$ and generate a decoded image signal for the display;
   wherein the image signal processor is adapted to determine $S_p$ based on a linear relationship when $S_e$ is between a gray level turn-off point ($S_o$) and a gray level threshold ($S_t$).

2. The system of claim 1 wherein the environmental processor is further adapted to receive programmable instructions for altering environmental processing depending on time of day.

3. The system of claim 1 wherein the environmental processor is further adapted to receive programmable instructions for altering environmental processing depending on display content.

4. The system of claim 1 wherein the environmentally-reactive control signal ($S_a$) contains an instantaneous value of a desired display black level $S_b$.

5. The system of claim 1 wherein the environmentally-reactive control signal ($S_a$) contains a signal linearity modification value.

6. The system of claim 1 wherein the gray level threshold ($S_t$) is an environmentally-reactive variable determined by the environmental processor.

7. The system of claim 1 wherein the gray level threshold ($S_t$) is determined by time of day.

8. The system of claim 1 wherein the gray level threshold ($S_t$) is determined by display content.

9. The system of claim 1 wherein:
the image signal processor is further adapted to set the pre-decoding image signal ($S_p$) equal to zero when the encoded image signal ($S_e$) is below the gray level turn-off point ($S_o$); and
the image signal processor is further adapted to determine $S_p$ based at least partially on a linearity modifier exponent $\beta$ when $S_e$ is above the gray level threshold ($S_t$).

10. The system of claim 9 wherein:
the image signal processor is further adapted to set the pre-decoding image signal ($S_p$) equal to zero when the encoded image signal ($S_e$) is equal to the gray level turn-off point ($S_o$); and
the image signal processor is further adapted to determine $S_p$ based at least partially on the linearity modifier exponent $\beta$ when $S_e$ is equal to the gray level threshold ($S_t$).

11. A system for altering characteristics of a display based on environmental data, the system comprising:
a light sensor;
an environmental processor adapted to receive electrical signals from the light sensor and generate an environmentally-reactive control signal ($S_a$);
an image signal processor adapted to accept $S_a$ and an encoded image signal ($S_e$) and generate a pre-decoding image signal ($S_p$); and
an image signal decoder adapted to accept $S_p$ and generate a decoded image signal for the display;
wherein the image signal processor is adapted to determine $S_p$ based on a sine curve when $S_e$ is between a gray level turn-off point ($S_o$) and a gray level threshold ($S_t$).

12. The system of claim 11 wherein the environmental processor is further adapted to receive programmable instructions for altering environmental processing depending on time of day.

13. The system of claim 11 wherein the environmental processor is further adapted to receive programmable instructions for altering environmental processing depending on display content.

14. The system of claim 11 wherein the environmentally-reactive control signal ($S_a$) contains an instantaneous value of a desired display black level $S_b$.

15. The system of claim 11 wherein the environmentally-reactive control signal ($S_a$) contains a signal linearity modification value.

16. The system of claim 11 wherein the gray level threshold ($S_t$) is an environmentally-reactive variable determined by the environmental processor.

17. The system of claim 11 wherein the gray level threshold ($S_t$) is determined by time of day.

18. The system of claim 11 wherein the gray level threshold ($S_t$) is determined by display content.

19. The system of claim 11 wherein:
the image signal processor is further adapted to set the pre-decoding image signal ($S_p$) equal to zero when the encoded image signal ($S_e$) is below the gray level turn-off point ($S_o$); and
the image signal processor is further adapted to determine $S_p$ based at least partially on a linearity modifier exponent $\beta$ when $S_e$ is above the gray level threshold ($S_t$).

20. The system of claim 19 wherein:
the image signal processor is further adapted to set the pre-decoding image signal ($S_p$) equal to zero when the encoded image signal ($S_e$) is equal to the gray level turn-off point ($S_o$); and
the image signal processor is further adapted to determine $S_p$ based at least partially on the linearity modifier exponent $\beta$ when $S_e$ is equal to the gray level threshold ($S_t$).

* * * * *

UNITED STATES PATENT AND TRADEMARK OFFICE
CERTIFICATE OF CORRECTION

PATENT NO.         : 10,255,884 B2
APPLICATION NO.    : 15/789707
DATED              : April 9, 2019
INVENTOR(S)        : William Dunn, Harry Presley and Jerry Wasinger It is certified that error appears in the above-identified patent and that said Letters Patent is hereby corrected as shown below:

On the Title Page

Page 3, item [56] delete "JP 6-18767 A 1/1993" and insert -- JP 5-18767 A 1/1993 --.

In the Specification

Column 3, Line 33, delete "$f_d\ i=(S)^\gamma.$" and insert -- $f_d=(S)^\gamma.$ --.

Column 3, Line 65, delete "power (c)" and insert -- power ($\varepsilon$) --.

Column 10, Line 37, delete "exponent c." and insert -- exponent $\varepsilon$. --.

Column 13, Line 18, delete "exponent c." and insert -- exponent $\varepsilon$. --.

Column 14, Line 50, delete "exponent c." and insert -- exponent $\varepsilon$. --.

Column 15, Line 60, delete "parameters $S_e$" and insert -- parameters $S_o$ --.

Signed and Sealed this
Twenty-fifth Day of June, 2019

Andrei Iancu
*Director of the United States Patent and Trademark Office*